(12) United States Patent
Bodden, Jr.

(10) Patent No.: US 8,720,730 B2
(45) Date of Patent: May 13, 2014

(54) LID SAVER AND METHOD

(76) Inventor: Douglas Bodden, Jr., Temple, PA (US)

( * ) Notice: Subject to any disclaimer, the term of this patent is extended or adjusted under 35 U.S.C. 154(b) by 43 days.

(21) Appl. No.: 13/565,349

(22) Filed: Aug. 2, 2012

(65) Prior Publication Data

US 2014/0034647 A1    Feb. 6, 2014

(51) Int. Cl.
    *B65D 55/16*    (2006.01)
    *B65F 1/14*    (2006.01)
    *B65F 1/16*    (2006.01)

(52) U.S. Cl.
    CPC .................... *B65D 55/16* (2013.01);
    *B65F 1/163* (2013.01)
    USPC .......................... 220/375; 220/830

(58) Field of Classification Search
    CPC ........ B65F 1/163; B65F 1/1623; B65D 55/16
    USPC .......... 220/495.06, 495.08, 375, 495.01, 264,
    220/263, 262, 260, 830, 827, 810, 200,
    220/908.1, 908
    See application file for complete search history.

(56) References Cited

U.S. PATENT DOCUMENTS

| | | | | | |
|---|---|---|---|---|---|
| 657,267 | A | * | 9/1900 | Epstein | 206/101 |
| 1,427,472 | A | * | 8/1922 | Huber | 220/264 |
| 1,475,567 | A | * | 11/1923 | Dall | 206/250 |
| 1,611,852 | A | * | 12/1926 | Cooper | 220/288 |
| 1,721,308 | A | * | 7/1929 | Lormor | 220/264 |
| 3,503,535 | A | * | 3/1970 | Sparks, Sr. | 220/326 |
| 4,339,056 | A | * | 7/1982 | Berkstresser et al. | 220/375 |
| 4,456,145 | A | * | 6/1984 | Frank | 220/242 |
| 4,513,877 | A | * | 4/1985 | Taguchi et al. | 220/830 |
| 8,210,385 | B1 | * | 7/2012 | Zurek et al. | 220/375 |
| 2005/0139598 | A1 | * | 6/2005 | Tack et al. | 220/259.1 |

* cited by examiner

Primary Examiner — Robert J Hicks

(57) ABSTRACT

A device for flexibly retaining lids or tops to containers or receptacles. Flexible coil chord secures a container or receptacle to its lid or top. The device allows for flexibly securing a lid to its container or receptacle to reduce loss or damage that could be avoided by retaining them in proximity to each other.

3 Claims, 2 Drawing Sheets

LID SAVER AND METHOD

CROSS REFERENCE TO RELATED APPLICATIONS

None.

STATEMENT REGARDING FEDERALLY SPONSORED RESEARCH/DEVELOPMENT

Not applicable.

BRIEF DESCRIPTION

The claimed invention is a lid retainer for use with waste, storage, or other receptacles.

BACKGROUND OF THE INVENTION

This invention relates to lid assemblies and, more generally, to container connectors. It is an improvement on existing devices and methods of securing lids to containers, such as trash cans, plastic storage canisters, cases or other receptacles.

Devices to secure lids to trash cans and various other containers are described in a variety of configurations. Lid anchoring attachments, leashes, securing assemblies, integrated lid/receptacle systems, fasteners, retainer straps and other lid restraining devices have been detailed.

Existing related art, in general, is subject to two manifest problems. First, devices presently used are complicated by multiple elements necessary for proper function. Even the simple inventions in this field are encumbered by plates, gaskets, reds, hinges, means to secure parts, springs, or other pieces needed to operate properly. Increasing the quantity of parts or different elements needed for operation results in greater potential for the device overall or components individually to break, wear out or otherwise need replacement. An obvious consequence of this is increased maintenance and cost to the user.

The second problem with existing related art is that devices currently available require an additional purchase of the container or receptacle itself, or at minimum, parts for attachment to a consumer's container or receptacle in addition to the device itself. This also results in higher ultimate cost to the user. The present invention is designed for use with containers or receptacles and their lids already owned and/or in current use by the user. No new purchase of the containers, receptacles or lids is required.

The present invention utilizes materials that are relatively newly commercially available. It is designed for simplicity, ease of manufacture and use, and can be installed and used on a variety of containers and receptacles already in use in homes and businesses.

BRIEF SUMMARY OF THE INVENTION

In view of the foregoing background, the present invention overcomes problems associated with more complicated, multi-elemental prior art, addressing the following objectives:

It is an object of this invention to provide a lid retainer to hold lids or tops to containers or receptacles in close proximity to the container or receptacle.

It is a further object of this invention to provide a lid retainer that can be easily retrofitted, or attached, to existing containers or receptacles.

It is a different objective of this invention to provide a lid retainer with a minimal number of parts for ease of attachment and use as well as optimized durability.

LIST OF THE FIGURES IN THE DRAWINGS

10 Coil chord body
20 End clips
30 Orifice in container or receptacle
40 Orifice in lid

DETAILED DESCRIPTION OF THE INVENTION

The invention presented herein is described more fully, referring to the accompanying drawings, which provide a preferred embodiment. This embodiment should not be construed as a limitation to the possible embodiments, as this invention may be embodied in other forms. This invention may be used with a variety of containers or receptacles as well as various lids, covers, or lid configurations that are used to cover the container or receptacle.

Figure 1:
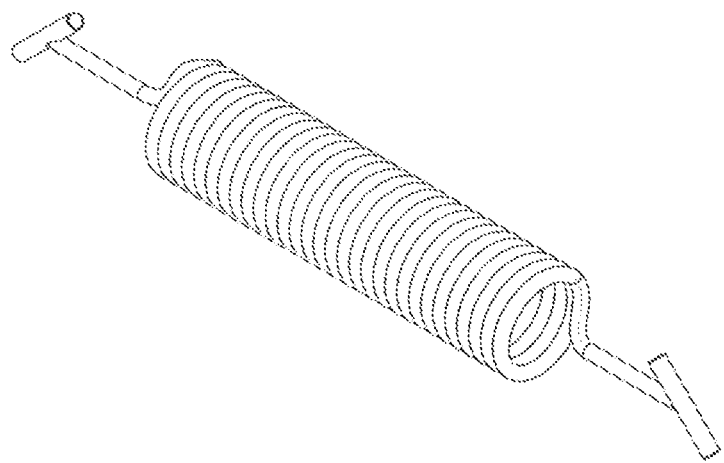
FIG. 1 is a perspective view of the invention.
Figure 2:
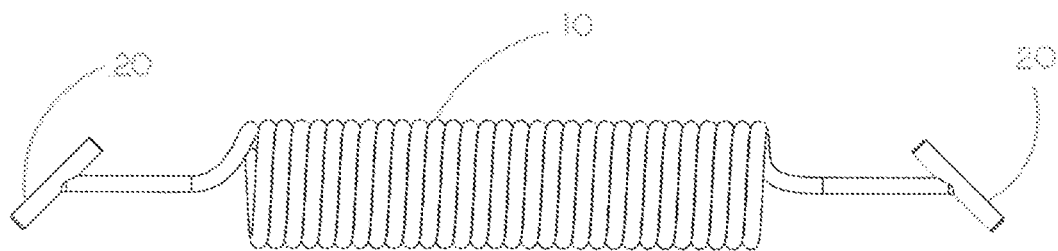
FIG. 2 is a view of the end clips attached to the coil chord body.
Figure 3:
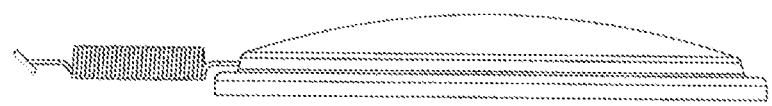
FIG. 3 shows the end clip inserted and secured in the orifice in the lid.
Figure 4:
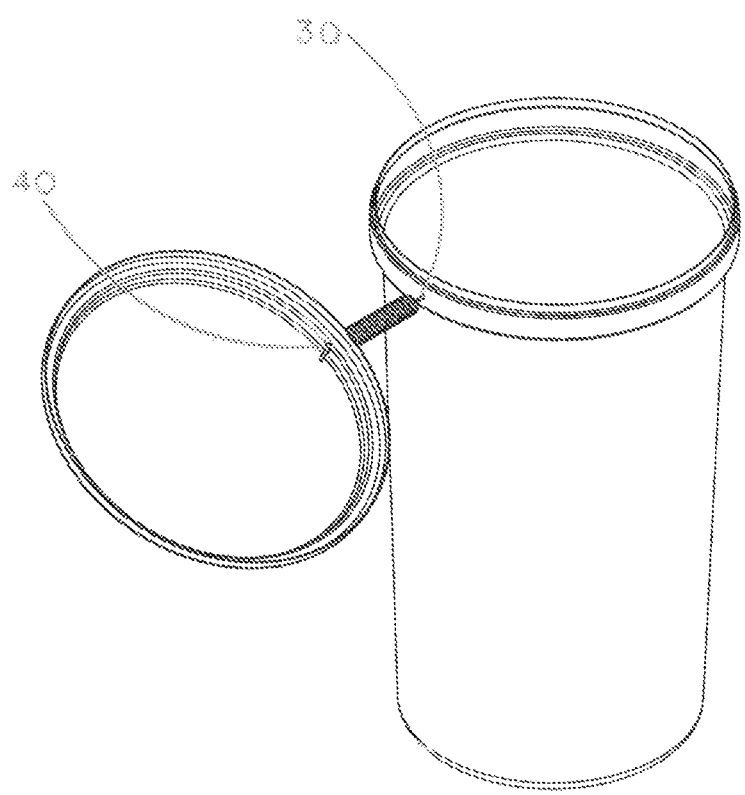
FIG. 4 is a view of the invention in the preferred embodiment attaching a lid to a container or receptacle.

This invention is shown in FIGS. 1 through 4 of the attached drawings. In FIG. 1, a perspective view of the invention is shown. Coil chord, which is a commercially available product, is used to form the coil chord body 10. It is generally constructed of flexible material enclosed in a plastic or rubber coating and rolled into a continuous coil, and cut to desired lengths. Because of its composition and shape, which is a course of winding spirals, the coil chord is elastic. The winding spirals, or coils, allow the chord to stretch under tension, but they retain their shape and return to the original coil dimensions once tension is released.

The coil chord body 10 is attached to end clips 20. The end clips 20 are fastened to the coil chord body 10 such that they maintain an angle relative to the coil chord body 10. A small orifice is initially punched or cut into the container itself 30. A second orifice is punched or cut into the lid 40. The end clip of one end, attached to the coil chord body 10, is squeezed to a flat orientation and passed through the container orifice 30. Once it passes through the orifice, the clip returns to its original orientation and stops the chord from passing back through the orifice. This process is repeated with the opposite end clip 20, passing it through the lid orifice. When both ends are positioned in their respective orifices, the lid will be flexibly attached to the container or receptacle by the invention.

The invention claimed is:

1. A lid retention device consisting essentially of a coil chord body with two ends, a first end and a second end, terminating in one of a pair of oppositely disposed end clips, a first end clip and a second end clip respectively, wherein said coil chord body is elastic, stretchable under tension and returns to its original shape or configuration once tension is released.

2. The lid retention device of claim 1 wherein said first end clip and said second end clip are axially positioned barbs.

3. A method of retaining a lid in proximity to a container utilizing a lid retention device consisting essentially of a coil chord body with a first end and a second end where said first end and said second end terminate in a first end clip and a second end clip, respectively, wherein said coil chord body is elastic, stretchable under tension and returns to its original shape or configuration once tension is released, comprising the steps of (1) piercing a first hole, or lid orifice, into the lid of a container; (2) piercing a second hole, or container orifice, into the container itself; (3) inserting said first end clip into said lid orifice; (4) inserting said second end clip into said container orifice.

* * * * *